United States Patent [19]

Chao

[11] Patent Number: 5,786,880
[45] Date of Patent: Jul. 28, 1998

[54] METHOD FOR FORMING A SPECTACLE FRAME HAVING A MAGNET MEMBER

[76] Inventor: David Yinkai Chao, 1120 Green Acre Rd., Towson, Md. 21204

[21] Appl. No.: 865,379

[22] Filed: May 29, 1997

[51] Int. Cl.⁶ ............................................. G02C 1/00
[52] U.S. Cl. ........................................ 351/41; 351/47
[58] Field of Search ............................. 351/41, 47, 51, 351/52, 57, 58

[56] References Cited

U.S. PATENT DOCUMENTS 5,416,537  5/1995  Sadler .................................. 351/57
5,568,207  10/1996  Chao .................................. 351/57

Primary Examiner—Hung X. Dang

[57] ABSTRACT

A method may form a spectacle frame having one or more magnets engaged in the spectacle frame without spoiling the outer appearance of the spectacle frame. One or more magnetizable members are engaged in the spectacle frame before the magnetizable members are magnetized. The magnetizable members are then magnetized for allowing the magnetizable members to be magnetized without damaging the outer appearance of the spectacle frame.

2 Claims, 2 Drawing Sheets

5,786,880

METHOD FOR FORMING A SPECTACLE FRAME HAVING A MAGNET MEMBER

BACKGROUND OF THE INVENTION

1. Field of the Invention

The present invention relates to a method, and more particularly to a method for forming a spectacle frame having one or more magnets for attaching an auxiliary frame.

2. Description of the Prior Art

Typical eyeglasses may include one or more magnets for attaching an auxiliary frame or for attaching auxiliary lenses. Two examples of the eyeglasses are disclosed in U.S. Pat. Nos. 5,416,537 to Sadler and 5,568,207 to Chao. The spectacle frame is required to be excavated with one or more holes for engaging with the magnets. However, the engagement of the magnets may damage the outer appearance, particularly the painting of the spectacle frame. In addition, the magnets have different colors from that of the spectacle frame such that the magnets may spoil the outer appearance of the beautiful spectacle frame.

The present invention has arisen to mitigate and/or obviate the afore-described disadvantages of the conventional eyeglasses.

SUMMARY OF THE INVENTION

The primary objective of the present invention is to provide a method for forming a spectacle frame having magnets and for allowing the magnets to be engaged in the spectacle frame without damaging the outer appearance of the spectacle frame.

In accordance with one aspect of the invention, there is provided a method for forming a spectacle frame having one or more magnets engaged in the spectacle frame, the method comprises engaging one or more magnetizable members in the spectacle frame before the magnetizable members are magnetized or after the magnetizable members have been magnetized. The magnetizable members may be engaged in the spectacle frame when the spectacle frame is molded or may be engaged in the spectacle frame by excavating the spectacle frame with one or more holes. The magnetizable members are then magnetized for allowing the magnetizable members to be magnetized without damaging the outer appearance of the spectacle frame.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
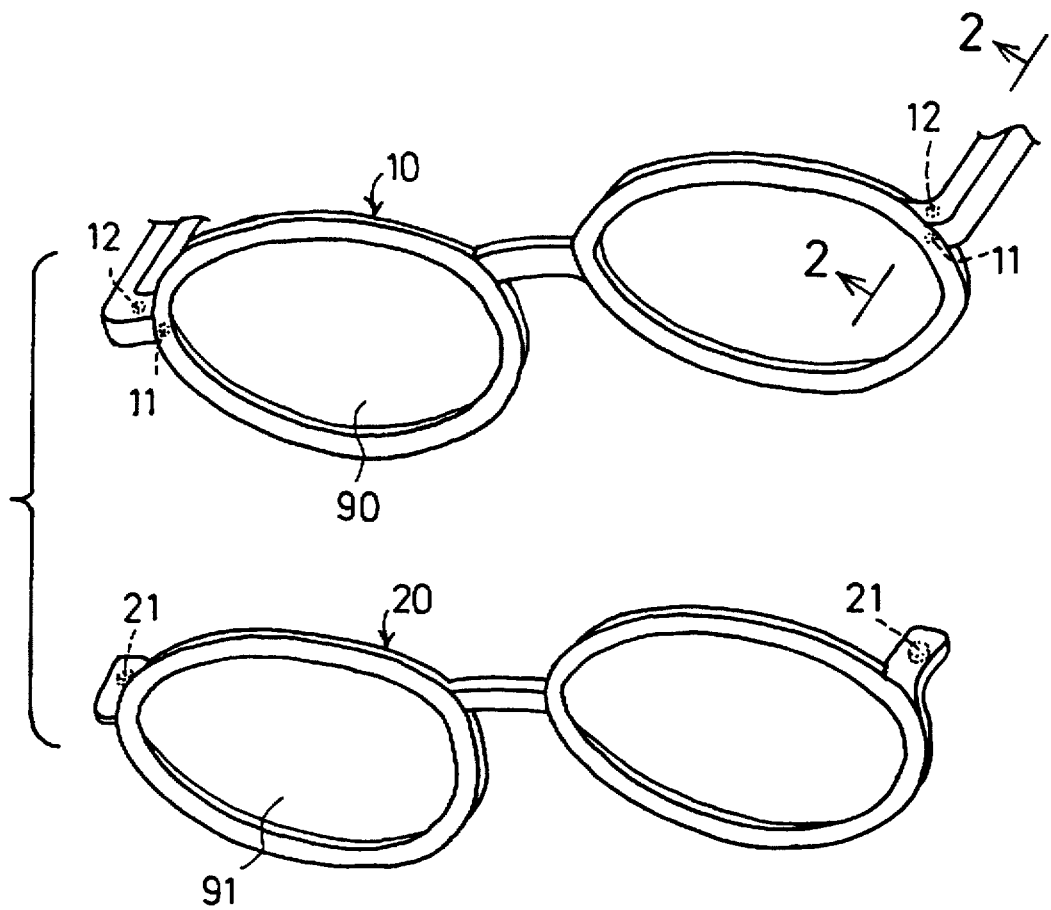
FIG. 1 is an exploded view of a spectacle frame to be made by the method in accordance with the present invention.

Referring to the drawings, and initially to FIG. 1, a spectacle frame in accordance with the present invention comprises a primary frame 10 for supporting primary lenses 90 and an auxiliary frame 20 for supporting auxiliary lenses 91. The primary frame 10 includes one or more magnets 11, 12 for engaging with the magnets 21 of the auxiliary frame 20 and for securing the auxiliary frame 20 to the primary frame 10.

Figure 2:
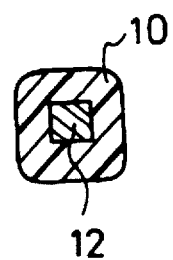
FIG. 2 is a cross sectional view taken along lines 2—2 of FIG. 1.

Referring next to FIG. 2, one or more magnetizable members 12, 21 are engaged in the frame 10, 20 when forming the frame 10, 20 by such as molding process and before the members 12, 21 are magnetized. The frame 10, 20 may also be excavated with one or more holes for engaging with the members 12, 21 which are not being magnetized yet at this moment and which may be secured to the frame 10, 20 by adhesive material. The frame 10, 20 may then be electroplated and painted such that the members 12, 21 may be suitably embedded in the frame 10, 20. It is to be noted that the frame 10, 20 and the members 12, 21 may not be suitably electroplated if the members 12, 21 have already been magnetized. The magnet members 12, 21 may attract other particles, to the spectacle frame such that the spectacle frame may not be formed with a smooth outer appearance after electroplating process.

Figure 3:
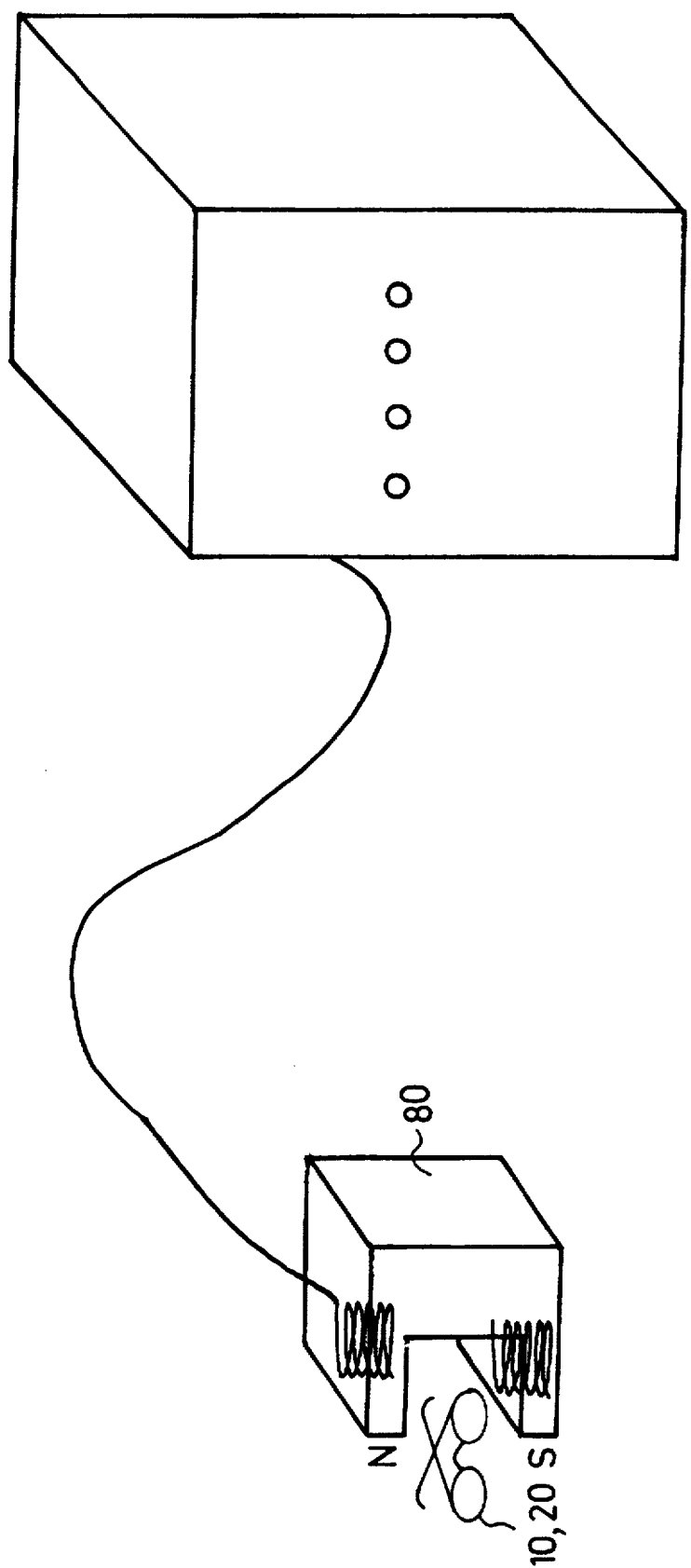
FIG. 3 is a schematic view illustrating the forming of the magnets.

Referring next to FIG. 3, the frame 10, 20 is then disposed in a magnetizing machine 80, such as an electromagnetic machine for allowing the magnetizing machine 80 to magnetize the members 12, 21 without damaging the outer appearance of the frame 10, 20. The members 12, 21 may thus be secured in the frame 10, 20 before they are magnetized and may then be magnetized without damaging the outer appearance of the frame.

Alternatively, a magnetizable member which has already magnetized is first engaged in a spectacle frame. The spectacle frame will not be electroplated and will be further treated by welding, washing,. painting, and drying processes. However, the hot working environment may demagnetize the members 12, 21 such that the members 12, 21 are required to be magnetized after the frame has been completely treated. The final magnetizing process may further magnetize the magnetizable members without damaging the outer appearance of the spectacle frame.

Accordingly, the method in accordance with the present invention may engage the magnets in the spectacle frame before the magnets are magnetized and may magnets after the magnets are engaged in the spectacle frame such that the magnets may be engaged in the spectacle frame without damaging the outer appearance of the spectacle frame.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A method for forming a spectacle frame having at least one magnet engaged in said spectacle frame, said method comprising:

engaging at least one magnetizable member in said spectacle frame, and magnetizing said at least one magnetizable member for allowing said at least one magnetizable member to be magnetized without damaging an outer appearance of said spectacle frame.

2. A method for forming a spectacle frame having at least one magnet engaged in said spectacle frame, said method comprising:

engaging at least one magnetizable member in said spectacle frame before said at least one magnetizable member is magnetized, and magnetizing said at least one magnetizable member for allowing said at least one magnetizable member to be magnetized without damaging an outer appearance of said spectacle frame.

* * * * *